July 23, 1935.  D. C. HEITSHU  2,009,261

TRACTOR

Filed Feb. 16, 1935

INVENTOR.
DANIEL C. HEITSHU
BY James A. Walsh
ATTORNEY

Patented July 23, 1935

2,009,261

UNITED STATES PATENT OFFICE 2,009,261

TRACTOR

Daniel C. Heitshu, Racine, Wis., assignor to J. I. Case Company, Racine, Wis., a corporation Application February 16, 1935, Serial No. 6,855

4 Claims. (Cl. 97—50)

My invention relates to tractors, and particularly to an improved motor lift adapted to be associated with and actuated by a power take-off shaft for raising and lowering tractor-mounted implements either while the tractor is traveling or in stationary position, so long as the tractor engine is running, which device may be readily installed initially or when desired, and consists in certain details of construction and arrangements of parts whereby a simply operated and effective device is provided, as will hereinafter more fully appear.

Figure 1:
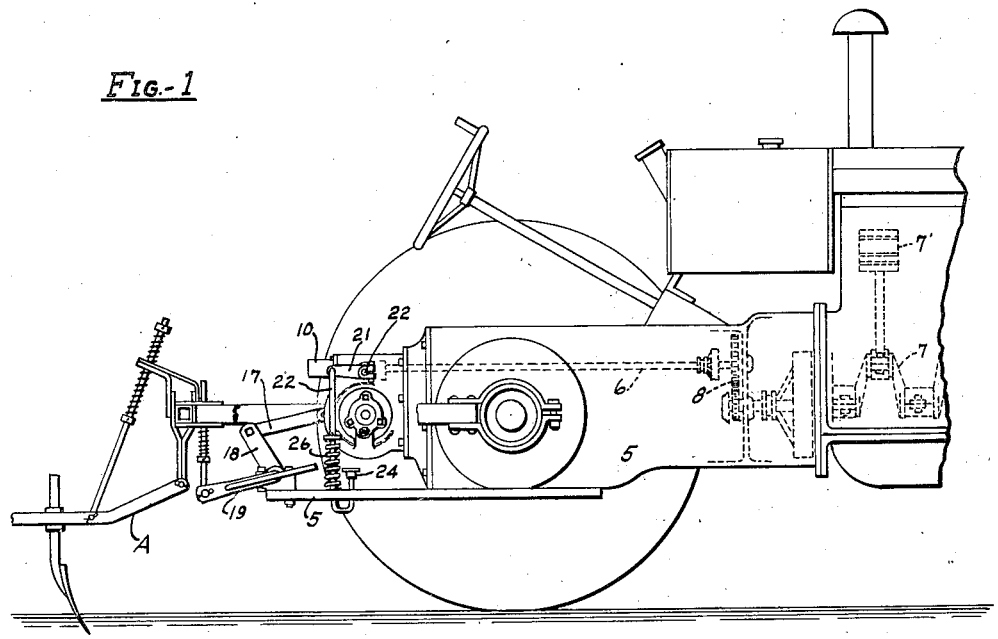
Figure 2:
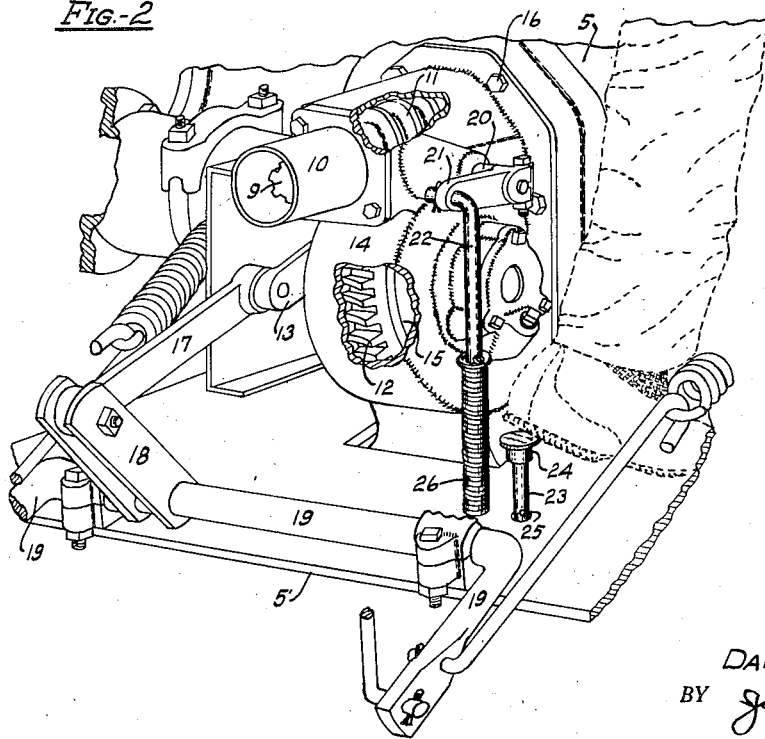
Figure 3:
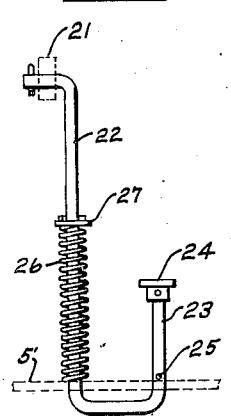

In the accompanying drawing, forming part hereof, Figure 1 is a side elevation in part of a tractor equipped with my improvement; Fig. 2, a fragmentary perspective of the rear portion of a tractor including said improvement; and Fig. 3 is an elevation of the power lift trip-rod which I employ.

In said drawing the numeral 5 indicates a tractor of well known construction including a power take-off shaft 6 geared to the crank-shaft 7, at 8, so that it will be directly driven by the engine, 7', and extending through the rear of the tractor, its projecting end 9 being splined or otherwise arranged for connecting thereto and to a drawn implement an extension drive shaft (not shown) in a common and well known manner, said splined end being protected by a removable shield 10 to avoid accidents. Near the end of the shaft 6 a worm 11 is provided, which engages a worm-wheel 12 mounted on crank-shaft 13 in a casing 14, which casing encloses the worm and gear as well as a clutch 15, and is secured to the tractor body by bolts 16, said worm, gear and clutch being of well known construction and operation and constituting an intermittent or half-revolution trip common in the art of power lifts.

To crank-shaft 13 a pitman 17 is connected, its opposite end pivotally attached to an arm 18 fixedly mounted upon a rocking bail 19 fastened to the platform 5' of the tractor so that it with the implement attached thereto, as A, may be raised and lowered as desired. A control shaft 20 having an arm 21 extends into casing 14 and is provided with well known means for controlling the revolution of the clutch mechanism 15, and to which arm a substantially U-shaped trip-rod 22 is pivotally attached and extends downwardly through platform 5', underlapping the same, and its shorter leg 23 projecting upwardly through the platform, Fig. 3, to produce a pedal, and preferably including a button 24, said leg 23 being perforated, at 25, to receive a pin, so that the trip-rod may be locked in fixed position when the tractor is employed for purposes not requiring the actuation of the power lift. The trip-rod 22 passes through an expansion spring 26 confined between platform 5' and a stop 27 substantially midway its length, and by underlapping the platform the latter serves as a stop to limit the upward movement of the rod and arm 21 attached thereto.

It will be understood that the energy of the power take-off shaft, derived directly from the engine of the tractor, actuates the power lift device to turn a half revolution when the trip-rod 22 is caused to pull downwardly on arm 21 by momentarily depressing button 24 to trip pedal 23, as by the heel 27 of the operator, so that should the bail 19 and implement A be in earth working position such half revolution of the clutch will raise them to clear the shovels from the ground surface, and when pressure on the button is again momentarily applied to trip pedal 23 the clutch will make another half revolution and thus cause the bail and implement to be returned to earth working condition. The spring 26 after each such operation returns the trip-rod and arm 20 to normal position. As the power take-off shaft is constantly running so long as the engine operates, the power lift clutch may be tripped at all times whether the tractor is moving or stationary, and which tripping may be performed by hand pressure on arm 21 if desired, as the trip mechanism is sensitively associated with the power lift and requires but quick slight pressure to perform the well known half revolution as commonly employed in connection with agricultural machinery. The tripping operation is usually employed for raising the implement from contact with obstructions in the field, making turns at the ends of rows, and while the tractor is traveling, but in circumstances where the tractor is employed for other purposes the implement may be removed and the trip-rod locked in inoperative condition by inserting a pin through the leg 23, or other locking means may be employed, for preventing downward actuating movements of the trip-rod.

I claim as my invention:

1. The combination, in a tractor, of an engine, a power take-off shaft engaging with and driven by the engine, a half-revolution power lift engaging and actuated by the power take-off shaft, and a trip-rod connected to the power lift and extending downwardly therefrom through and underlapping a part of the tractor and terminating in an upwardly extending pedal member projecting through part of the tractor.

2. The combination, in a tractor, of an engine, a power take-off shaft engaging with and driven by the engine, a half revolution power lift engaging and actuated by the power take-off shaft, a trip-rod connected to the power lift and extending downwardly therefrom through and underlapping part of the tractor and terminating in an upwardly extending pedal, and yielding means on the trip-rod and abutting the tractor for controlling vertical movements of the trip-rod.

3. The combination, in a tractor, of an engine, a power take-off shaft engaging with and driven by the engine, an intermittent power lift engaging and actuated by the power take-off shaft, a trip-rod connected to the power lift and extending downwardly therefrom and passing through and underlapping part of the tractor, an upwardly extending pedal forming part of the trip-rod, and a spring on said rod for controlling its vertical movements.

4. The combination, in a tractor, of an engine, a power take-off shaft engaging with and driven by the engine, a half-revolution power lift engaging and actuated by the power take-off shaft, a trip-rod connected to the power lift and movably mounted on the tractor, said rod terminating in a pedal vertically operable by pressure, and means for locking the pedal to the tractor to prevent actuation of the trip-rod.

DANIEL C. HEITSHU.